United States Patent
Likosar et al.

(10) Patent No.: US 9,611,875 B2
(45) Date of Patent: Apr. 4, 2017

(54) UNIVERSAL HOLDING CLAMP FOR HOLDING OBJECTS OF ANY DESIRED TYPE

(71) Applicant: Ferdinand Likosar, Bludesch (AT)

(72) Inventors: Juliane Likosar, Bludesch (AT); Ferdinand Likosar, Bludesch (AT)

(73) Assignee: Ferdinand Likosar, Bludesch (AT)

(*) Notice: Subject to any disclaimer, the term of this patent is extended or adjusted under 35 U.S.C. 154(b) by 0 days.

(21) Appl. No.: 14/428,524

(22) PCT Filed: Sep. 12, 2013

(86) PCT No.: PCT/EP2013/002739
§ 371 (c)(1),
(2) Date: Mar. 16, 2015

(87) PCT Pub. No.: WO2014/040735
PCT Pub. Date: Mar. 20, 2014

(65) Prior Publication Data
US 2015/0226244 A1    Aug. 13, 2015

(30) Foreign Application Priority Data

Sep. 14, 2012  (DE) .................. 10 2012 018 175

(51) Int. Cl.
*F16B 2/18*    (2006.01)
*F16B 2/10*    (2006.01)
(Continued)

(52) U.S. Cl.
CPC ............. *F16B 2/18* (2013.01); *A63C 11/02* (2013.01); *B25H 3/04* (2013.01); *F16B 2/005* (2013.01); *F16B 2/10* (2013.01); *Y10T 24/44342* (2015.01)

(58) Field of Classification Search
CPC .... F16B 2/18; F16B 2/005; F16B 2/10; Y10T 24/44342; B25H 3/04; A63C 11/02
See application file for complete search history.

(56) References Cited

U.S. PATENT DOCUMENTS 2,384,636 A * 9/1945 Nelson ..................... B66C 1/48
                                                    24/517
2,488,709 A * 11/1949 Colwell ................... A47G 1/21
                                                    223/96
(Continued)

FOREIGN PATENT DOCUMENTS

AT        391795 B1    11/1990
DE        4437257 C1   11/1995
(Continued)

*Primary Examiner* — Robert J Sandy
*Assistant Examiner* — Louis Mercado
(74) *Attorney, Agent, or Firm* — Browdy and Neimark, PLLC

(57) ABSTRACT

A holding clamp having two clamping jaws, which are located opposite each other in mirror-image fashion relative to a baseplate and can be rotated as a function of each other and at a distance from each other on axle pins arranged on the baseplate, wherein the clamping jaws are connected to axle sleeves, which are mounted on the axle pins such that they can rotate, and a synchronization mechanism for transmitting the pivoting movement from one clamping jaw to the other is formed from at least one toothed gear element, wherein the gear element is formed by a rack which, at each of the two opposite ends thereof, carries a toothed part, which is respectively in toothed engagement with a respective partial toothing system on the outer circumference of the axle sleeve of the clamping jaw.

11 Claims, 2 Drawing Sheets

Figure 1:
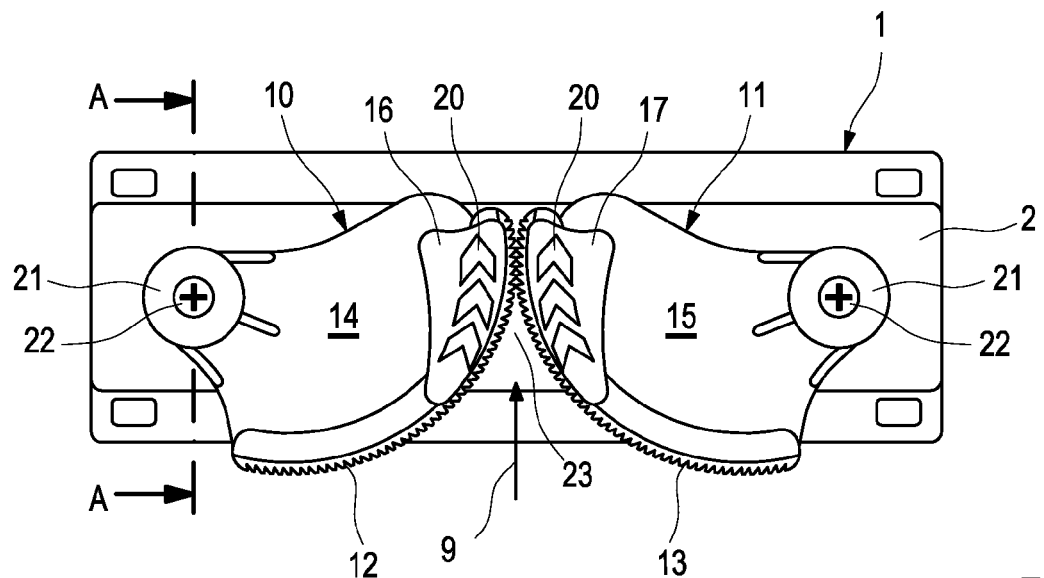

(51) Int. Cl.
*F16B 2/00* (2006.01)
*A63C 11/02* (2006.01)
*B25H 3/04* (2006.01)

(56) References Cited

U.S. PATENT DOCUMENTS

| | | | | |
|---|---|---|---|---|
| 2,722,727 A | * | 11/1955 | Scheifele | A01K 97/10 403/374.2 |
| 2,794,537 A | * | 6/1957 | Holliday | A01D 45/16 198/803.7 |
| 2,888,295 A | * | 5/1959 | Burnham | F16G 11/10 24/523 |
| 2,943,878 A | * | 7/1960 | Rigaud | E05B 85/247 280/435 |
| 3,156,388 A | * | 11/1964 | Simmons | B25H 3/00 211/70.6 |
| 3,249,328 A | * | 5/1966 | Knowles | B64D 17/38 24/602 |
| 3,265,032 A | | 8/1966 | Hume et al. | |
| 3,425,732 A | * | 2/1969 | Reich | A22B 7/001 294/115 |
| 3,453,703 A | * | 7/1969 | Wilson | A01K 91/18 24/507 |
| 3,453,774 A | * | 7/1969 | Gruber | A63H 33/00 124/27 |
| 4,620,499 A | * | 11/1986 | Slemmons | B63B 21/08 114/218 |
| 4,716,811 A | * | 1/1988 | Johnson | F41A 23/50 24/495 |
| D348,196 S | * | 6/1994 | Forsberg | D8/72 |
| 6,105,915 A | | 8/2000 | Naham et al. | |
| 6,217,094 B1 | * | 4/2001 | Hanaduka | B25J 13/088 294/106 |
| 6,409,136 B1 | * | 6/2002 | Weiss | B60N 3/102 224/926 |
| 6,932,312 B1 | * | 8/2005 | Chen | B25H 3/04 211/60.1 |
| D636,657 S | * | 4/2011 | Quinlan | D8/354 |
| 8,550,413 B2 | * | 10/2013 | Warrick | A61J 1/16 248/229.22 |
| 8,573,576 B2 | * | 11/2013 | Clark | B25B 5/04 269/157 |
| 2011/0114580 A1 | * | 5/2011 | Chen | B25H 3/04 211/70.6 |
| 2012/0049020 A1 | * | 3/2012 | Stock | F16B 2/10 248/206.5 |
| 2014/0251725 A1 | * | 9/2014 | Schurian | A62B 35/0025 182/3 |

FOREIGN PATENT DOCUMENTS

| | | |
|---|---|---|
| DE | 102005027202 A1 | 12/2006 |
| EP | 0381224 B1 | 6/1993 |
| EP | 1936209 A2 | 6/2008 |
| WO | 96/24004 A1 | 8/1996 |
| WO | 102012018175 B3 | 12/2013 |

* cited by examiner

UNIVERSAL HOLDING CLAMP FOR HOLDING OBJECTS OF ANY DESIRED TYPE

The invention relates to a universal holding clamp for holding objects of different types and of any desired type according to the preamble of patent claim 1.

Such a holding clamp is known, for example, from the subject matter of EP 0 381 224 B1, which only describes an intended purpose for holding skis, however.

Such a holding clamp is also known, for example, from the subject matter of AT 391 795 B or DE 44 37 257 C1. The holding clamp described therein is characterized in that two clamping jaws, which are arranged so they are rotatable and are synchronized with one another in their rotational or clamping movement, are provided on a base plate. The synchronization between the rotational movements of the two clamping jaws is produced by a connecting linkage. A rotationally-fixed arm is connected to the respective axial sleeve, on which the clamping jaw is fastened, and the two arms, which are oriented toward one another, overlap in the middle region of the base plate and are articulated there via an oblong hole guide, to thus transmit the movement of one arm to the other arm. Instead of an oblong hole guide, gear teeth can also be provided.

This accordingly relates to a trailing synchronization between the rotational movement of one clamping jaw, which is transmitted via the intersecting holding arms and the parallel guide arranged thereon to the other clamping jaw. EP 0 381 224 B1 does also describe that gear teeth which mesh with one another can be provided at the ends of the arms. However, the disadvantage of such a synchronization is that the replacement of the oblong hole guide by gear teeth at the free end of intersecting arms results in an unstable guide, which is not secured against bending out and cannot transmit high rotational forces.

Therefore, the disadvantage exists that synchronization cannot be achieved between the clamping jaws during the rotation. Because of the linearly implemented pivot arms, an uneven rotational drive of the two clamping jaws associated with one another occurs, which is linked to the disadvantage that an object cannot be securely clamped.

Furthermore, it is disadvantageous that the connecting linkage used for synchronization is exposed and can result in injuries to the hand of a user. In addition, the exposed synchronization mechanism is susceptible to failure, is susceptible to soiling, and is subject to substantial wear.

A further disadvantage of the known design is that mutual pre-tensioning of the clamping jaws in the closing direction is only provided by gravity. This means that the known wall holder was only suitable for holding skis or other hanging objects, because the closing force on the clamping jaws in the closing direction was only produced by gravity on the clamping jaws, which pivot back into the closed position because of gravity.

In the case of the use of such a synchronization linkage, the further disadvantage exists that self-locking is present in the open state, which has the result that one-handed operation is not possible. In the open state of the clamping jaws, the self-locking must be canceled by engaging with one hand, to move an object into the open clamping gap between the clamping jaws and move the clamping jaws into their closed position with the other hand.

For the mentioned reasons, the known holding clamp was only usable as a wall holder and had a poor clamping action.

The invention is therefore based on the object of refining a holding clamp of the type mentioned at the outset so that it unfolds a clamping action universally, independently of its fastening location and independently of the weight and the shaping of the object to be clamped.

To achieve the stated object, the invention is characterized by the technical teaching of claim 1.

The essential feature of the invention is that the gearing element for transmitting the rotational or pivot movement of the clamping jaws associated with one another is formed by a toothed rack.

Instead of a linearly moved toothed rack, however, rotationally driven gearwheels can also be provided. The use of a toothed rack is described in the following description solely for simpler description, although the invention is not restricted thereto.

With the given technical teaching, the advantage results that automatic synchronization without play is performed by the gearing element (toothed rack), wherein in a preferred embodiment, the toothed rack has a toothed part on each of its ends opposite to one another, which is located in gear teeth engagement, with gear teeth arranged on the external circumference of the clamping jaw, with gear teeth arranged on the external circumference of the respective clamping jaw.

In relation to the prior art, which provides gear teeth in the middle region of two intersecting arms, the invention has the advantage that the known, central gear teeth are now divided into two sets of gear teeth separate from one another, and both sets of gear teeth, which are separate from one another, are now displaced into the region of the pivot bearings of the clamping jaws. A space-saving structure thus results, because pivot arms can be omitted. Furthermore, high torques can be transmitted from one set of gear teeth via the toothed rack to the other set of gear teeth, because the two sets of gear teeth are arranged directly in the rotational center of the clamping jaws.

In this manner, automatic synchronization without play is achieved between the pivot movement of one clamping jaw in the direction in relation to the pivot movement of the other clamping jaw, so that both clamping jaws are driven absolutely without play and always synchronized with one another, and play can no longer occur, as was known in the case of an oblong hole pin guide or a scissors-type guide for synchronization according to the prior art.

The advantage results with the invention that such a holding clamp firstly provides that the toothed rack is not pre-tensioned by spring loading. In this general embodiment, it is provided that the holding clamp is fastened on a wall surface, and therefore the closed position of the clamping jaws results because of gravity, as was also the case in the prior art.

In a preferred refinement of the present invention, however, it is provided that the toothed rack is drawn by spring loading into a specific starting position, wherein the spring force is preferably achieved by a traction spring. It is ensured by this force accumulator that the clamping jaws are pre-tensioned by spring loading in the closed position and therefore a clamping gap which practically approaches zero is present in the closed position.

Therefore, the possibility exists for the first time of clamping very thin or narrow objects. It is even possible to provide a holding clamp using the features of the invention, using which a business card or other thin and light objects can be properly clamped.

Due to the spring pre-tensioning of the toothed rack, which is used for the synchronization of the pivot movement of the two clamping jaws associated with one another, it is furthermore ensured that the holding clamp can be installed in any desired installation location and any desired installation attitude. The invention is therefore no longer dependent on the clamping jaws assuming their closed position because of gravity, because the spring pre-tensioning of the toothed rack ensures that independently of the installation attitude of the holding clamp, the clamping jaws always pass into a spring pre-tensioned starting position or zero position.

Therefore, the holding clamp according to the invention is also referred to as a universal holding clamp, because it can also be installed overhead, laterally, or on inclined fastening surfaces, and because of the spring pre-tension of the clamping jaws, it is always ensured that the clamping jaws come into a spring pre-tensioned closed position.

According to the technical teaching of claim 1, it is primarily unimportant where the toothed rack is installed. It can be fastened visibly on the upper side on the base plate of the holding clamp; however, it can also be arranged invisibly in the bottom part of the holding clamp, i.e., thus on the rear side of the holding clamp.

In the following description, for the sake of simpler description, it is presumed that the toothed rack used for the synchronization is arranged concealed in the bottom part, which ensures that the toothed rack and the entire synchronization mechanism are protected against soiling and wear or against the penetration of foreign bodies. In addition, a risk of injury is prevented, because it is no longer possible to engage in the synchronization mechanism, as was the case in the prior art.

The synchronization mechanism is therefore also protected against damage, because in the preferred embodiment, the toothed rack is arranged in the bottom region of the base plate. The displacement control is performed therein by associated stop and longitudinal guiding ribs, wherein the installation space in which the toothed rack is received is covered by a cover.

In a refinement of the invention, it is provided that the open position of the clamping jaws is implemented so it can be latched. For this case, it can be provided that a latching means is arranged in the displacement path of the toothed rack, for example, a top dead center spring or the like, so that it is only possible to pass from the latched open position into the closed position by overcoming using a specific closing force.

Instead of the traction spring mentioned here, which pre-tensions the toothed rack in the closed position, all other known force accumulators can also be used, for example, elastomeric force accumulators, leg springs, angled springs, coiled compression springs, and the like.

In a preferred embodiment of the invention, it is provided that the actuation of the clamping jaws is performed using a single hand, i.e., with the aid of the object to be clamped itself, which is held by one hand. It is thus sufficient to guide the object to be clamped against the clamping jaws closed under spring load, so that they open automatically and the object to be held can be inserted into the opening gap.

For this purpose, the invention provides that, above the holding plates, which are part of the rotatable clamping jaws, inclined conical opening attachments, which are oriented outward and upward, are provided, which form insertion bevels, into which the object is pressed, whereby the clamping jaws automatically open against the spring force of the traction spring on the toothed rack and release the clamping gap.

Single-handed operation is therefore possible for the first time, without one hand being required for opening or closing the clamping jaws.

In a preferred embodiment of the invention, it is furthermore provided that the clamping surface of the clamping jaws is provided with a clamping coating, wherein the clamping coating preferably consists of an elastomeric material.

However, it can also be provided that the clamping jaws and the clamping coating consist of a two-component plastic, whereby the clamping coating is injected as a softer elastomeric plastic directly onto the harder remaining material of the clamping jaw.

The inventive subject matter of the present invention results not only from the subject matter of the individual patent claims, but rather also from the combination of the individual patent claims with one another.

All specifications and features disclosed in the documents of the application, including the abstract, in particular the spatial implementation illustrated in the drawings, are claimed as essential to the invention, insofar as they are novel individually or in combination over the prior art.

In the following, the invention is explained in greater detail on the basis of drawings, which only illustrate one embodiment. In this case, further features essential to the invention and advantages of the invention are disclosed in the drawings and the description thereof.

In the figures:

FIG. 1: shows a top view of the holding clamp according to the invention

Figure 2:
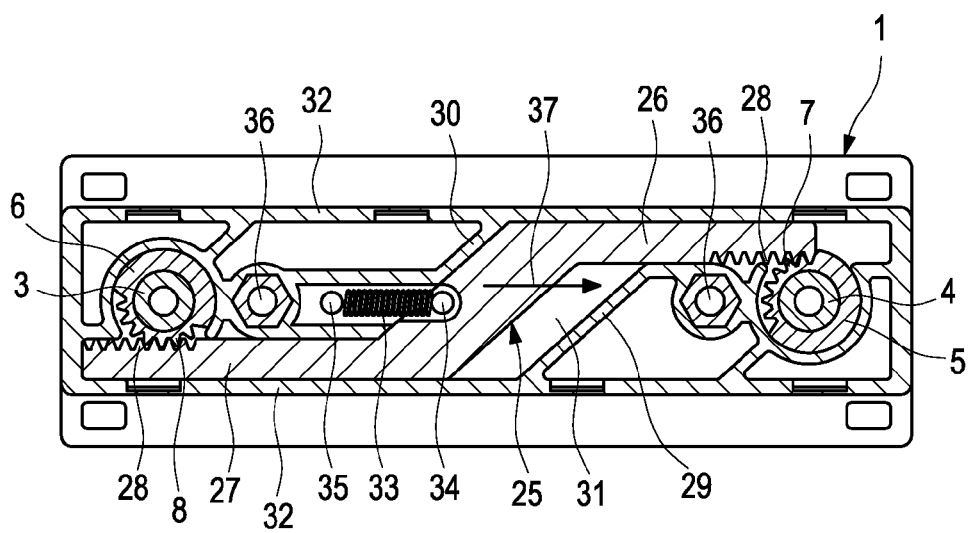
Figure 3:
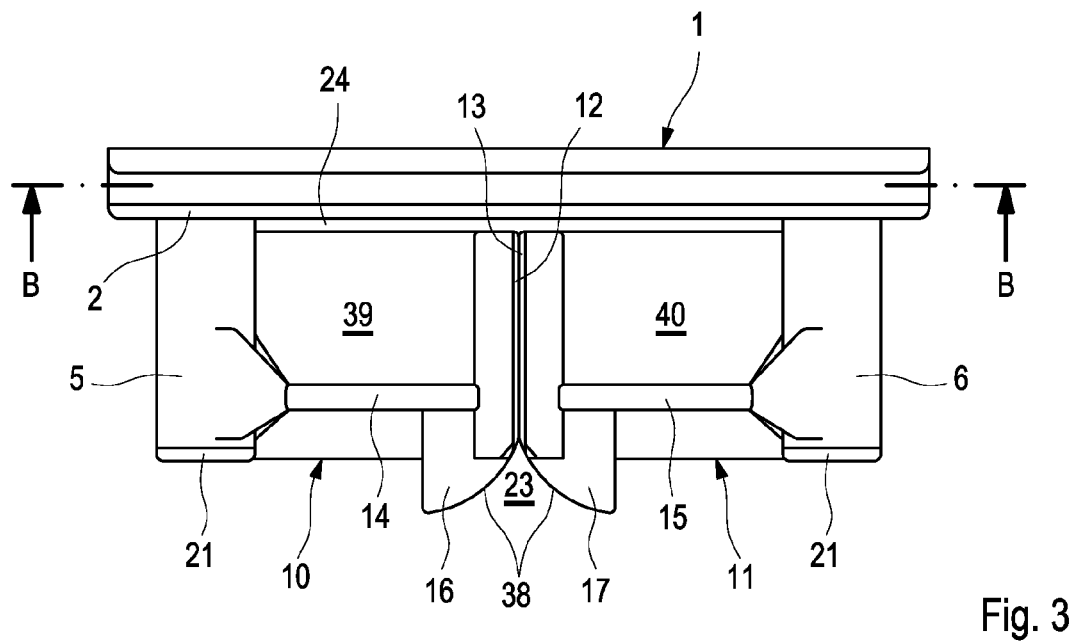

FIG. 2: shows a top view of the upper side of the base plate with removed cover according to section B-B in FIG. 3

FIG. 3: shows a frontal view of the arrangement in the closed state

Figure 4:
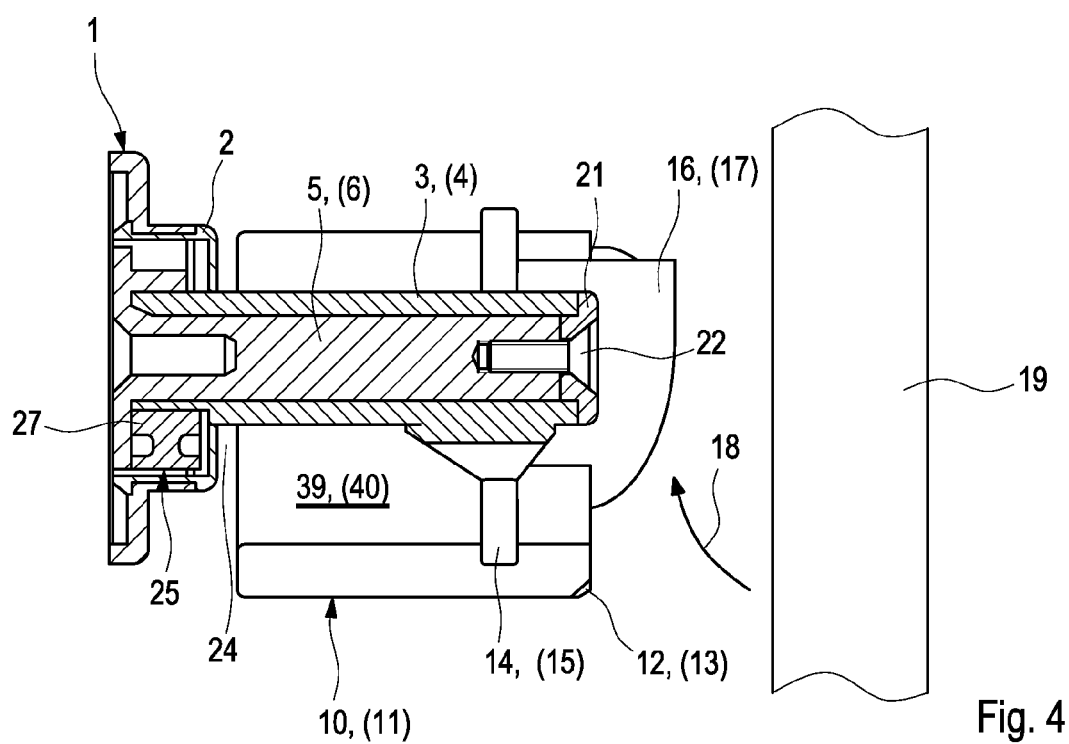

FIG. 4: shows a section through the arrangement according to section A-A in FIG. 1.

The holding clamp essentially consists of a base plate 1, which is covered on top by a cover 2.

According to FIG. 4, two axial pins 3, 4, which are arranged at a distance to one another, are preferably implemented in a material-integral manner with the of base plate 1 according to FIG. 4, these pins forming the pivot bearings for the clamping jaws 10, 11 to be described hereafter.

Each axial sleeve 5, 6 is a component of one clamping jaw 10, 11 respectively and is connected in a material-integral manner thereto. This results, for example, from FIG. 4, wherein it is recognizable that the axial sleeves 5, 6 are each connected in a material-integral manner via a connection attachment to one holding plate 14, 15 respectively.

Arced curvature surfaces 39, 40, which are each coated on their outer side with a clamping coating 12, 13, extend perpendicularly to the respective holding plate 14, 15.

The clamping coating 12, 13 can thus either be glued as a separate part onto the curvature surface 39, 40 or the curvature surfaces 39, 40 can be implemented as a whole as the clamping coating 12, 13 from a single elastomeric part.

In another embodiment, it can be provided that the part consisting of uniform material, consisting of curvature surface 39, 40 and clamping coating 12, 13, is connectible to the clamping jaw separately from the remaining parts thereof.

It can also be provided that these parts form a material-integral part of the clamping jaw 10, 11.

For the synchronization of the pivot movement of the two clamping jaws 10, 11 assigned to one another, the synchronization mechanism according to the invention is provided, which essentially consists of a toothed rack 25, which is arranged in a recess 31 in the base plate 1 and is mounted so it is displaceable.

The toothed rack 25 has bent regions 26, 27 implemented opposite to one another, on the front free end of which a toothed part 28 is arranged in each case.

Each toothed part 28 meshes with an associated partial set of gear teeth 7, 8 on the outer circumference of the axial sleeve 5, 6.

The toothed rack 25 is mounted so it is displaceable (in the arrow direction 37 and in the opposite direction thereto) in the recess 31 of the base plate 1, wherein a right stop rib 29 delimits the displacement to the right and a left stop rib 30 delimits the displacement to the left, while longitudinal guiding ribs 32, which are at an angle thereto and are spaced apart parallel to the movement direction of the toothed rack 25, are provided for the longitudinal guiding in the base plate 1. Stable longitudinal and transverse guiding is thus provided for the toothed rack 25, which can therefore transmit high clamping forces from one to the other clamping jaw 10, 11 without buckling or another impermissible deformation of the toothed rack 25 being able to occur. The bottom-side terminus of the base plate 1 by a cover 2 also helps here, which protects the toothed rack 25 over its entire flat side against bulging out during the transmission of higher synchronization forces.

In the middle region of the toothed rack, a fastening point 34 is provided, at which one end of a traction spring 33 engages, the other end of which is fixed so it is stationary on the base plate 1 at a fastening point 35.

It is important in the embodiment according to FIG. 2 that the traction spring 33 always holds the two clamping jaws 10, 11 in the closed position by spring pre-loading in the closed position according to FIG. 1 or FIG. 3, so that the insertion gap 23 is always closed in a spring pre-loaded manner.

To enable actuation of the holding clamp without action of a hand, it is provided that the opening of the holding clamp and the production of the clamping action are performed by the object 19 to be held itself (see FIG. 4). The object 19, which is implemented as a round tube here, for example, is guided in the insertion direction 18 against upper inclined opening attachments 16, 17, which are provided with insertion bevels 38, and which are formed as insertion ribs fixedly on the holding plates 14, 15.

Additional markings 20 can also be applied to these opening attachments 16, 17, to also make it visually clear that an object moved against the holder in the insertion direction 18 only has to be placed on the opening attachments 16, 17 and pressed in to thus open both clamping jaws 10, 11 in a spring-loaded manner.

The two clamping jaws 10, 11 carry out a pivot movement in the arrow direction 9 to open the insertion gap 23.

To enable free pivoting of the two clamping jaws 10, 11 in relation to the base plate 1, a clearance 24 is provided above the cover 2 of the base plate 1.

Moreover, FIGS. 1 and 4 show a disk 21, which is used as a pull-off protector of the axial sleeves 5, 6, so that they cannot be pulled off of the stationary axial pins 3, 4. The disk 21 is fixed using a screw 22 in the axial sleeve 5, 6 in each case, and is used as a pull-off protector for the axial sleeves 5, 6, which rotate under the disk 21.

Screw boreholes 36 are also provided in the region below the cover 2 in the recess 31 of the base plate 1, through which screws (not shown in greater detail) engage, which fix the holding clamp on a holding surface.

The advantage of the holding clamp is that it can be held, because of the spring pre-tension of the toothed rack 25, in any arbitrary installation attitude or fastening attitude, so that it is even possible to provide the holding clamp according to the invention with a handle, to use the holding clamp as a holding or carrying tool, using which, for example, heavy chipboard slabs, glass plates, or other elements can be carried by one person.

Instead of the use of a toothed rack as a gearing element of the synchronization mechanism, other, similarly acting gearing elements, such as semicircular gearwheels which mesh with one another or the like, can also be used.

| List of reference numerals | |
|---|---|
| 1 | base plate |
| 2 | cover |
| 3 | left axial pin |
| 4 | right axial pin |
| 5 | left axial sleeve |
| 6 | right axial sleeve |
| 7 | left partial set of gear teeth |
| 8 | right partial set of gear teeth |
| 9 | arrow direction |
| 10 | left clamping jaw |
| 11 | right clamping jaw |
| 12 | left clamping coating |
| 13 | right clamping coating |
| 14 | holding plate |
| 15 | holding plate |
| 16 | opening attachment |
| 17 | opening attachment |
| 18 | insertion direction |
| 19 | object |
| 20 | marking |
| 21 | disk |
| 22 | screw |
| 23 | insertion gap |
| 24 | clearance |
| 25 | toothed rack |
| 26 | bent region (of 25) |
| 27 | bent region (of 25) |
| 28 | toothed part |
| 29 | stop rib |
| 30 | stop rib |
| 31 | recess |
| 32 | longitudinal guiding rib |
| 33 | traction spring |
| 34 | fastening point |
| 35 | fastening point |
| 36 | screw borehole |
| 37 | arrow direction |
| 38 | insertion bevel |
| 39 | curvature surface |
| 40 | curvature surface |

The invention claimed is:

1. A holding clamp having two clamping jaws (10, 11), which oppose one another in a mirror image with respect to a base plate (1), and which are rotatable in dependence on one another and on axial pins (3, 4) arranged spaced apart from one another on the base plate (1), wherein the clamping jaws (10, 11) are connected to axial sleeves (5, 6), which are mounted so they are rotatable on the axial pins (3, 4), and a synchronization mechanism for transmitting a pivot movement from one to the other clamping jaw (10, 11) is formed from at least one toothed gearing element, wherein the gearing element is formed by a toothed rack (25), which carries a toothed part (28) on each of its two opposing ends, which has a gear teeth engagement in each case with a partial set of gear teeth (7, 8) in each case on an outer circumference of the axial sleeve (5, 6) of the clamping jaw (10, 11), wherein the toothed rack (25) is pre-tensioned by a spring element, which pre-tensions the clamping jaws (10, 11) in a closed position, and an actuation of the clamping jaws (10, 11) is performed by an object to be clamped itself, wherein a displacement of the toothed rack (25) is delimited by stop ribs (29, 30) on a bottom side of the base plate (1).

2. The holding clamp according to claim 1, wherein the clamping jaws (10, 11) are formed from arced curvature surfaces (39, 40).

3. The holding clamp according to claim 1, wherein the toothed rack (25) is installed concealed in a bottom part of the holding clamp.

4. The holding clamp according to claim 1, wherein an open position of the clamping jaws (10, 11) is implemented so it can be latched.

5. The holding clamp according to claim 1, the clamping jaws (10, 11) are connected to holding plates (14, 15), on which inclined conical opening attachments (16, 17), which are oriented outward and upward with respect to an insertion gap, (23) are formed, which implement insertion bevels (38), into which the object is pressed.

6. The holding clamp according to claim 1, wherein the clamping jaws (11, 12) carry an elastomeric clamping coating (12, 13).

7. The holding clamp according to claim 1, wherein the toothed rack (25) is mounted so it is displaceable in a recess (31) in the base plate (1).

8. The holding clamp according to claim 1, wherein longitudinal guiding of the toothed rack (25) is performed by longitudinal guiding ribs (32) spaced apart from one another in parallel to a movement direction of the toothed rack (25).

9. The holding clamp according to claim 1, wherein a fastening point (34) for one end of a traction spring (33) is arranged in a middle region of the toothed rack (25), the other end of which is fixed in a stationary manner on the base plate in a fastening point (35).

10. A holding clamp having two clamping jaws (10, 11), which oppose one another in a mirror image with respect to a base plate (1), and which are rotatable in dependence on one another and on axial pins (3, 4) arranged spaced apart from one another on the base plate (1), wherein the clamping jaws (10, 11) are connected to axial sleeves (5, 6), which are mounted so they are rotatable on the axial pins (3, 4), and a synchronization mechanism for transmitting a pivot movement from one to the other clamping jaw (10, 11) is formed from at least one toothed gearing element, wherein the gearing element is formed by a toothed rack (25), which carries a toothed part (28) on each of its two opposing ends, which has a gear teeth engagement in each case with a partial set of gear teeth (7, 8) in each case on an outer circumference of the axial sleeve (5, 6) of the clamping jaw (10, 11), wherein the toothed rack (25) is pre-tensioned by a spring element, which pre-tensions the clamping jaws (10, 11) in a closed position, and an actuation of the clamping jaws (10, 11) is performed by an object to be clamped itself, wherein longitudinal guiding of the toothed rack (25) is performed by longitudinal guiding ribs (32) spaced apart from one another in parallel to a movement direction of the toothed rack (25).

11. A holding clamp having two clamping jaws (10, 11), which oppose one another in a mirror image with respect to a base plate (1), and which are rotatable in dependence on one another and on axial pins (3, 4) arranged spaced apart from one another on the base plate (1), wherein the clamping jaws (10, 11) are connected to axial sleeves (5, 6), which are mounted so they are rotatable on the axial pins (3, 4), and a synchronization mechanism for transmitting a pivot movement from one to the other clamping jaw (10, 11) is formed from at least one toothed gearing element, wherein the gearing element is formed by a toothed rack (25), which carries a toothed part (28) on each of its two opposing ends, which has a gear teeth engagement in each case with a partial set of gear teeth (7, 8) in each case on an outer circumference of the axial sleeve (5, 6) of the clamping jaw (10, 11), wherein the toothed rack (25) is pre-tensioned by a spring element, which pre-tensions the clamping jaws (10, 11) in a closed position, and an actuation of the clamping jaws (10, 11) is performed by an object to be clamped itself, wherein a fastening point (34) for one end of a traction spring (33) is arranged in a middle region of the toothed rack (25), the other end of which is fixed in a stationary manner on the base plate in a fastening point (35).

* * * * *